United States Patent
Broadbent

[15] 3,663,829
[45] May 16, 1972

[54] PRESSURE SENSITIVE CONTROL APPARATUS

[72] Inventor: Arnold Broadbent, Shaw, England

[73] Assignee: Parks-Cramer (Great Britain) Ltd., Oldham, Lancashire, England

[22] Filed: Sept. 14, 1970

[21] Appl. No.: 71,661

Related U.S. Application Data

[62] Division of Ser. No. 826,550, May 21, 1969.

[52] U.S. Cl............................................307/118, 307/144
[51] Int. Cl......................................................H01h 35/18
[58] Field of Search................307/118, 116, 117, 141, 144, 307/139; 200/83

[56] References Cited

UNITED STATES PATENTS 3,498,091  3/1970  Mason.................................307/118

Primary Examiner—Herman J. Hohauser
Attorney—Parrott, Bell, Seltzer, Park & Gibson

[57] ABSTRACT

The control apparatus of this invention is for controlling the operation of a mechanism in response to repeated long-term changes in fluid pressure; e.g., a fiber-conveying air stream, wherein the fluid also is subject to short-term pressure changes such as are attendant to turbulence of an air stream, for example. The apparatus comprises a flexible diaphragm movable in response to both repeated long-term and repeated short-term pressure changes and also includes time delay means connecting a movable means, which is movable between first and second positions by the diaphragm, to the mechanism for effecting a desired response in the mechanism at such times that the movable means occupies a selected one of the first and second positions for a predetermined long-term period of time established by the time delay means and thereby avoiding rapidly repeated intermittent responses of the mechanism as a result of the short-term pressure changes acting on the diaphragm.

4 Claims, 3 Drawing Figures

Patented May 16, 1972
3,663,829
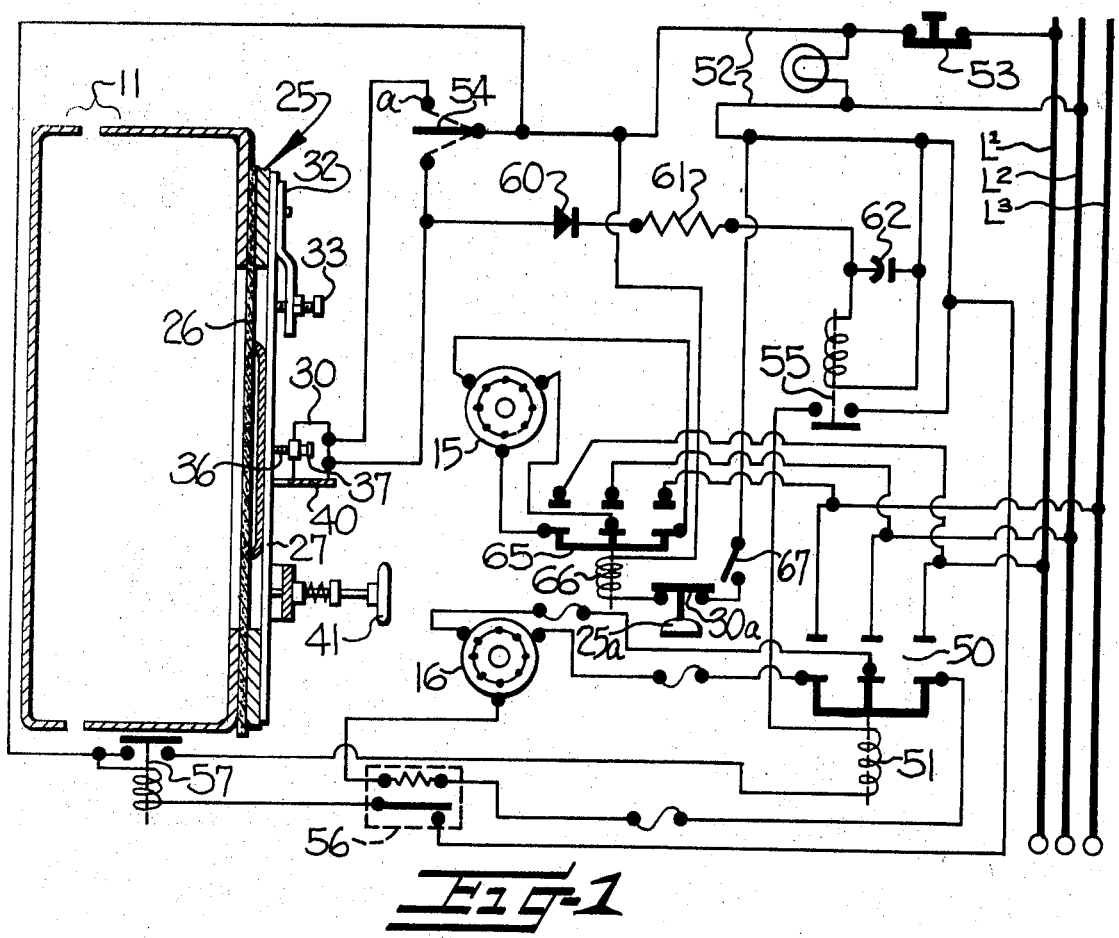
Fig-1
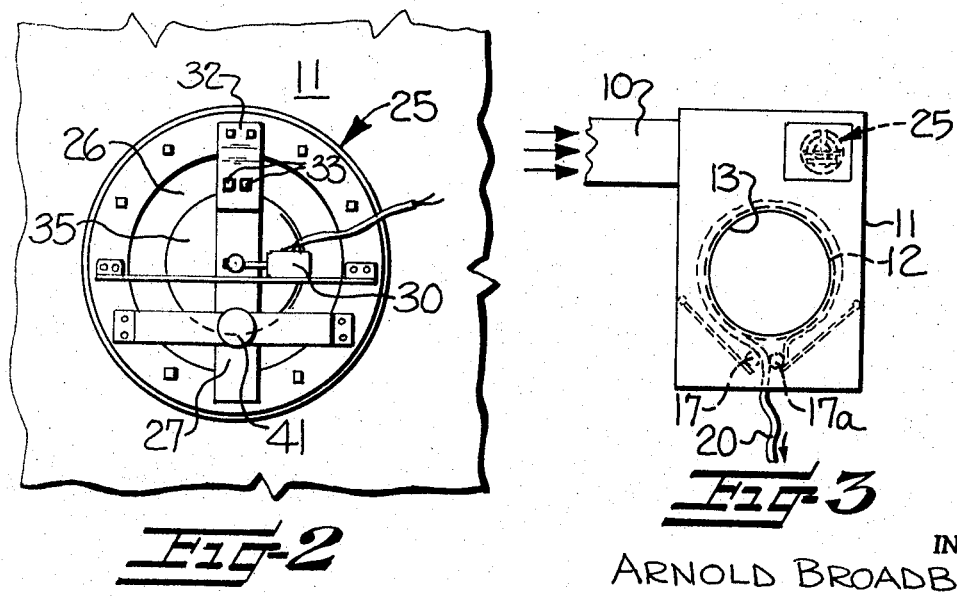
Fig-2
Fig-3
INVENTOR:
ARNOLD BROADBENT
BY Parrott, Bell, Seltzer, Park & Gibson
ATTORNEYS

PRESSURE SENSITIVE CONTROL APPARATUS

This application is a division of my copending application Ser. No. 826,550, filed May 21, 1969, and titled METHOD AND APPARATUS FOR SEPARATING TEXTILE FIBERS FROM CONVEYING AIR.

Various forms of pressure sensitive control apparatuses utilizing diaphragms are shown in the art. Some types of such control apparatuses operate in response to differential pressure, others operate in response to a positive pressure only, and still others operate in response to a negative pressure only. The limits to which a pressure sensitive control apparatus can be made to operate depend primarily upon the sensitivity of the diaphragm. However, very sensitive diaphragms may produce problems in the operation of the associated control circuit, especially in instances in which air entering a corresponding chamber does so at very high velocities causing considerable turbulence in the chamber itself. Being very sensitive, such diaphragms will cause the control circuit to switch on and off at very frequent intervals which, in the case of electrical motors and the like, may cause over-heating of the motor and rapid wear of associated relays, switches, and the like.

It is an object of this invention to provide an improved pressure sensitive control apparatus for use in pressurized systems, and which obviates the foregoing problem without reducing the sensitivity of the apparatus, by eliminating the effect of rapidly repeated short-term movements or vibrations of the diaphragm of the apparatus, such that the mechanism being controlled by the apparatus will respond only to relatively long-term changes in the position of the diaphragm effected by corresponding long-term changes in pressure being sensed by the diaphragm.

It is a more specific object of this invention to provide a pressure sensitive control apparatus comprising a flexible diaphragm which is movable in response to both long-term and short-term changes in fluid pressure thereagainst, and wherein a movable means adjacent the diaphragm is operatively connected to a responsive mechanism, such as an electric motor, by means of a time delay means. The time delay means is arranged to delay response of the mechanism to movement of the movable means from a first position to a second position for a predetermined period of time, substantially greater than the duration of each short-term change in fluid pressure, following each time that the movable means is moved from the first position to the second position by the diaphragm. On the other hand, if the movable means continues to dwell in the second position after expiration of the aforementioned predetermined period of time, the movable means then effects the desired response in the mechanism. Thus, the desired response of the mechanism is only effected upon each relatively long-term period during which the movable means occupies the second position as the result of a long-term change in pressure being sensed by the diaphragm.

Some of the objects of the invention having been stated, other objects will appear as the description proceeds when taken in connection with the accompanying drawing, in which FIG. 1 is a schematic view of a preferred embodiment of the pressure sensitive control apparatus of this invention showing the diaphragm assembly in cross-section in association with an electrical circuit;

FIG. 2 is an outside elevation of the diaphragm assembly, on a reduced scale, looking at the right-hand side of the diaphragm assembly in FIG. 1; and FIG. 3 is an elevation of a fiber waste filter box on a reduced scale showing the diaphragm assembly in association therewith.

The pressure sensitive control apparatus of this invention is adaptable for use in controlling any mechanism which must be activated or inactivated, as the case may be, in response to changes in pressure of any fluid in a container, chamber or casing, relative to a predetermined optimum pressure, and wherein such fluid is subject to turbulence or motion such as to produce repeated, rapid short-term fluctuations in pressure even though the overall pressure of such fluid may not change to such extent as to require a change in the state of the mechanism being controlled by the pressure sensitive control apparatus.

The invention is particularly useful in air circulating systems such as are employed in textile mills for disposing of fiber waste generated as an incident of the operation of textile machines. Therefore, the invention is shown in association with a filter box of a pneumatic fiber waste disposal system of a type such as is disclosed and claimed in my said copending U.S. application, Ser. No. 826,550, filed May 21, 1969, whose disclosure is incorporated herein by reference.

As shown in FIG. 3, air laden with waste material, for example, textile waste from carding machines, is carried by a pneumatic conveyor or air inlet duct 10 into a chamber defined within the upper portion of a substantially rectangular casing or filter box 11. A generally cylindrical rotary filter drum or cage 12 is rotatably mounted within the lower portion of casing 11, and air which flows through the filter drum 12 is exhausted from one side of the casing through the opening 13. Fan means or blower means, not shown, producing the circulation of air through the pneumatic conveyor 10 and the casing 11 may be driven by an electrically operable responsive mechanism such as an electric motor 15, and intermittent rotation may be imparted to the rotary filter drum 12 by suitable connections thereof, not shown, with an electrically operable responsive mechanism embodied in an electric motor 16 (FIG. 1). Motor 16 may also drive an pair of stripper or doffer rolls 17, 17a arranged to strip the collected fibers from the outer surface of filter drum 12 so that they emerge from a suitable opening in the lower portion or bottom of filter box 11 in the form of a fibrous web or mat 20.

In the type of pressurized fluid system shown in FIG. 3, it is desirable to maintain pressure within predetermined limits within the filter box 11 so that the flow of the fiber waste laden air stream through the pneumatic conveyor may be continuous and so that the fiber waste will be effectively removed from the region of the textile machines. Also, it is desirable to accumulate substantial amounts of fiber waste on the outer periphery of the filter drum 12 so that the fiber waste is withdrawn from filter drum 12 in the form of the mat or fibrous web 20. It follows, therefore, that it is desirable to rotate filter drum 12 only at such times as the amount of fiber waste on the filter drum tends to produce a predetermined relatively slight back pressure within the upper portion of filter box 11. The pressure sensitive control apparatus of this invention is particularly useful in controlling the operation of the drive motor 16 for filter drum 12 and doffer rolls 17, 17a. The control apparatus is responsive, in this instance, to a predetermined rise or increase in air pressure within filter box 11 (back pressure) incident to build-up of fibers on filter drum 12, for momentarily rotating filter drum 12 and doffer rolls 17, 17a. In so doing a portion of the mat of fibers is removed from the drum until a sufficient area of the periphery of the drum to the right of roll 17a is exposed in FIG. 3 so that the air stream may flow freely therethrough and rectify the increase in air pressure.

Accordingly, a preferred form of the pressure sensitive control apparatus of this invention comprises a diaphragm assembly broadly designated at 25 and including a thin, flexible diaphragm 26 of relatively large diameter; e.g., 8 to 12 inches, which is mounted with one face thereof exposed to the air in filter box 11. Diaphragm 26 preferably is made from polytetrafluoroethylene/asbestos or other suitable resilient, fireproof material, and is suitably secured to the outer surface of one wall of the upper portion of filter box 11 in alignment with a corresponding aperture formed in the wall of filter box 11.

Diaphragm 26 is movable by static air pressure within filter box 12 against the action of adjustable compression spring means such as a composite leaf spring 27 to move a first movable means from a first position to a second position. Such first movable means comprises a first, normally open, electrical pressure switch 30 which is closed repeatedly by diaphragm 26 and is connected in an integrating circuit arranged to judge trends in pressure conditions within filter box 11 rather than erratic pressure fluctuations. The diaphragm assembly 25 can be adjusted to accommodate a wide range of pressure variations by varying the compression of the spring 27.

As shown in FIGS. 1 and 2, the upper end only of leaf spring 27 is secured to a rigid ring 31 which secures diaphragm 26 to filter box 11. The upper portion of spring 27 is provided with a bracket 32 whose lower portion is spaced outwardly from spring 27. Adjustment screws 33, threaded through the lower portion of bracket 32, are adapted to engage the upper outer surface of spring 27 for adjusting the sensitivity thereof.

A disc 35, of substantially lesser diameter than the internal diameter of ring 31, may be provided between spring 27 and diaphragm 26. A projection 36 on a medial portion of spring 27 engages the inner surface of an actuator arm 37 of pressure switch 30. Arm 37 is normally biased to open position toward spring 27 by conventional means, not shown. Switch 30 is suitably secured to a transverse bar 40 whose opposite end portions are secured to ring 31 (FIG. 2). Fine adjustments may be made in the sensitivity of spring 27 and diaphragm 26 by a manually operable adjustment screw 41 threadedly penetrating another transverse bar 42 whose opposite end portions are suitably secured to ring 31.

As heretofore stated, in some applications very sensitive diaphragms may produce problems in the operation of the associated control circuit, especially in instances in which air entering a corresponding chamber does so at very high velocity causing considerable turbulence in the chamber itself. Being very sensitive, such diaphragms heretofore have caused the associated control circuit to switch on and off at very frequent intervals. To obviate this problem the control circuit of FIG. 1 is provided for controlling the operation of the electric motor 16 for the filter drum 12 in accordance with variations in static pressure within filter box 11. The diaphragm assembly 25 is of the positive pressure type, as is preferred.

Pressure switch 30 is normally open and will be closed or activated each time diaphragm 26 is moved outwardly a predetermined distance from its relaxed position by air pressure within filter box 11. Accordingly, due to the turbulence of the high pressure air entering filter box 11, diaphragm 26 is subject to constant vibration. Unless such vibration is controlled or rectified either mechanically or electrically, this would result in motor 16 being repeatedly turned on and off within relatively short periods of time which, in turn, would cause the usual overload circuit breaker or breakers associated with such motor to break the circuit to the motor and render the drive means for filter drum 12 and doffer rolls 17, 17a inoperative. The electrical circuit of FIG. 1 is arranged so as to render relatively short-term active intervals of pressure switch 30 ineffective to energize motor 16, and to render relatively long-term active intervals of switch 30 effective to energize motor 16.

As shown, motor 16 is arranged to be electrically connected to lead conductors $L^1$, $L^2$, $L^3$ from a high voltage source of electrical energy through second switch means embodied in the normally open contacts or switch element of a main electromagnetic relay 50. The coil 51 of main relay 50 is arranged in parallel with pressure switch 30 and in series with a pair of lower voltage conductors 52 connected to lead conductors $L^1$, $L^2$. A self-locking push button master switch 53, a manually operable, double throw switch 54 and the coil of an electromagnetic auxiliary relay 55 are also arranged in series with pressure switch 30. Switch 53 and the normally open switch element of relay 55 are arranged in series with coil 51 of main relay 50. A suitable overload relay circuit breaker 56 has its thermal element or resistor interposed in one of the leads between drum drive motor 16 and main relay 50.

The coil of an overload relay 57 and the switch element of circuit breaker 56 are arranged in series with master switch 53 and in parallel with the switch element of relay 57. The latter switch element is in series with main relay coil 51. Thus, upon occurrence of an overload condition of drum drive motor 16, circuit breaker 56 will interrupt the flow of current through the coil of relay 57 which will, in turn, stop the flow of current to coil 51 and stop the motor 16. Such overload condition may occur, for example, in the event of a blockage inside filter box 11 hindering or obstructing rotation of filter drum 12 and/or doffer rollers 17, 17a, such as an excessive accumulation of fibers between drum 12 and rollers 17, 17a caused by failure of the rollers to remove the mat from filter drum 12.

According to the invention, the lower voltage circuit also comprises time delay means including a diode 60, a resistor 61, and a capacitor 62. Diode 60 and resistor 61 are in series with the coil of auxiliary relay 55, and capacitor 62 is in series with diode 60 and resistor 61, but in parallel with the latter coil. When manual switch 54 occupies a first position in engagement with contact a, the operation of electric motor 16 then is entirely automatic in response to the diaphragm controlled pressure switch 30, since pressure switch 30 then is in series with conductors 52, diode 60, resistor 61, and the coil of relay 55. When manual operation of motor 16 is desired, switch 54 is moved to a second position engaging contact b to again place diode 60, resistor 61, and the coil of relay 55 in series relationship, but in parallel with or by-passing pressure switch 30.

As earlier described, electric motor 15 drives a fan (not shown) for effecting flow of air through pneumatic conveyor 10 and filter box 11. Current is directed from lead conductors $L^1$, $L^2$, $L^3$ through a fan motor electromagnetic relay 65 to motor 15. The coil 66 of relay 65 is connected, in series with a switch 67 and a second, normally closed, pressure switch 30a, to lower voltage conductors 52. Pressure switch 30a, although normally closed, should be substantially identical to pressure switch 30 and mounted adjacent a diaphragm assembly 25a in air inlet duct 10 or on any of the walls of filter box 11, as desired, so as to be subject to the pressure of the fiber conveying air stream flowing into filter box 11.

Although the use of second pressure switch 30a is optional, it is provided as a safety measure in the event of an abnormal overload condition of motor 16 and failure of circuit breaker 56 to then stop motor 16. As stated earlier herein such abnormal overload condition may occur in the event of a blockage inside filter box 11 hindering or obstructing rotation of filter drum 12 and/or doffer rollers 17, 17a, such as an excessive accumulation of fibers between drum 12 and rollers 17, 17a.

Second pressure switch 30a may be adjusted to open and stop the flow of current to relay coil 66 only upon the occurrence of an intolerably high back pressure in filter box 11 substantially above the predetermined maximum tolerable back pressure at which the coil of auxiliary relay 55 is caused to be energized. Thus, upon occurrence of such excessively high pressure in filter box 11, the fan or blower will stop and the following consequent reduction of pressure in filter box 11 will permit diaphragm 26 to open the first pressure switch 30 and the switch element of auxiliary relay 55 to also stop filter drum drive motor 16. Switch 67 may be of any well known type which will open automatically upon a break in the flow of current therethrough so that the fan will not restart until switch 67 is closed manually.

METHOD OF OPERATION

In operation, it is to be assumed that switches 30a, 53, 67 are closed so that relay 65 is closed to operate the fan motor 16 and direct a fiber laden air stream under predetermined pressure through pneumatic conveyor 10 into filter box 11.

The velocity of the fiber laden air stream at normal operating pressure may be in the range of about 160-300 feet per minute at a volume of about 10,000-16,000 cubic feet per minute, for example, depending upon the type of textile equipment with which the filter box is being used. The fibers may be fed at different rates or intermittently, as desired. For example, the filter box may be used for the disposition of fly in various textile rooms, or it may be connected directly to carding engines, combers, spinning frames, twisters, or other textile machinery.

It is also to be assumed that there is a relatively small cleared area of filter drum 12 exposed to the flow of air therethrough and that pressure switch 30 is open, with the exception of the short-term closed periods thereof incident to high frequency vibration of diaphragm 26. Relays 50, 55, 57 are also open so that drum drive motor 16 is not operating and filter drum 12 and doffer rollers 17, 17a are stationary.

During such condition of the apparatus, the air passes through filter drum 12 and then to the atmosphere as the fibers and other particles accumulate on the outer surface of the filter drum 12. As the fibrous bat builds up on the periphery of filter drum 12, the bat eventually becomes so thick that the air has difficulty in entering the filter drum and a back pressure builds up within the filter box 11 and duct 10. During the increase in back pressure, the high pressure air stream is naturally turbulent to such extent as to impart vibrations to diaphragm 26 of such magnitude and frequency as to repeatedly close and open pressure switch 30.

As heretofore indicated, high frequency fluctuations of the introduction of electrical energy to motor 16 are deleterious and will cause the usual circuit breakers associated therewith, such as circuit breaker 56, to interrupt the flow of current to motor 16 and render the drive means for the filter drum and the doffer rollers inoperative. However, with manual switch 54 occupying the first position in engagement with contact a, short-term periods of closing of switch 30 have no affect on motor 16 because diode 60 allows a single phase current to flow in one direction, during which resistor 61 limits the charging rate of capacitor 62 which, in turn, smooths out the pulses received from pressure switch 30 as effected by high frequency vibration of diaphragm 26.

As the back pressure increases, the open periods of pressure switch 26 become shorter with respect to the closed periods thereof as the diaphragm 26 is forced outwardly of its normal position for periods of relatively increasing duration and holds pressure switch 30 in closed position. When the back pressure reaches predetermined tolerable or long-term maximum pressure above the normal operating pressure produced by the fan, capacitor 62 becomes fully charged and its time delay function will no longer be effective as it discharges current to the coil of auxiliary relay 55. As heretofore stated, second pressure switch 30a functions in a manner similar to that of first pressure switch 30 so that the flow of current to fan motor 15 will be interrupted only upon occurrence of an intolerably excessive back pressure in filter box 11 and inlet duct 10.

It is apparent that the discharge of current through the coil of auxiliary relay 55 closes its switch element and completes a circuit to the coil 51 of main relay 50, causing the contacts thereof to close and energize motor 16. Motor 16 then imparts rotation to filter drum 12 in a counterclockwise direction in FIG. 3 and continues to do so until a falling trend of the back pressure in filter box 11 is established. During this falling trend in back pressure, pressure fluctuations again repeatedly close and open switch 30, but this time the open periods are of progressively increasing length, and capacitor 62 continues to discharge through the relay coil to keep it energized until the open periods increase to such extent that the charge is dissipated, whereupon the coil of relay 55 deenergizes and motor 16 stops. It is apparent that, upon a substantial bat of fibers building up on the exposed previously cleared area of filter drum 12, a repeat cycle in the operation of the apparatus will be effected as long as switch 54 remains in engagement with contact a of FIG. 1.

It is thus seen that, by providing a diaphragm 26 of relatively large area (about 8 to 12 inches in diameter), this increases the resultant force of the pressurized air in the filter box acting on the diaphragm to increase the sensitivity thereof enabling it to respond efficiently to pressure changes. The electrical integrating circuit may be very simple, but nevertheless, it ensures that a smooth flow of current is introduced to the drum drive motor 16 only when it is needed. The similar diaphragm of second pressure switch 30a also ensures that current is introduced to fan motor 15 as long as an intolerable excessively high back pressure does not develop within filter box 11 and inlet duct 10.

In the drawings and specification there has been set forth a preferred embodiment of the invention and although specific terms are employed, they are used in a generic and descriptive sense only, and not for purposes of limitation.

I claim:

1. A pressure sensitive control apparatus comprising a flexible diaphragm movable in response to both long-term and short-term changes in fluid pressure thereagainst, a first movable means adjacent said diaphragm and movable in opposite directions by and with movement of said diaphragm, time delay means operatively connected to said first movable means and activated in response to each movement of said first movable means from a first position to a second position, a second movable means operatively connected to said time delay means, a mechanism operatively connected to and responsive to movement of said second movable means from one position to another position, and said time delay means including means to move said second movable means from said one position to said other position upon expiration only of a predetermined period of time following each time that said first movable means is moved to said second position whereby a delayed response of said mechanism is effected only upon said first movable means occupying said second position for said predetermined period of time.

2. A pressure sensitive control apparatus according to claim 1, wherein said time delay means and said mechanism are electrically operable, said first movable means comprises switch means electrically connected to said time delay means when said first movable means occupies said second position, and said second movable means comprises an electromagnetically operated switch element electrically connected to said mechanism when said second movable means occupies one only of its positions.

3. A pressure sensitive control apparatus according to claim 1, wherein said mechanism is electrically operable, an electromagnetic relay including a coil, said first movable means comprising switch means, said time delay means comprising a diode and a resistor in series with and interposed in an electrical circuit between said switch means and said coil, and a capacitor in parallel with said coil but in series with said diode and said resistor, said second movable means comprising a switch element normally occupying a first position and movable to a second position in response to said coil being energized, said switch means being adapted to be moved from an open position to a closed position upon each said movement of said first movable means from said first position to said second position to cause current to flow through said diode, said resistor and said capacitor, said diode and resistor preventing said capacitor from reaching a full charge until after said switch means has occupied said closed position for a predetermined period of time whereby, upon expiration of said predetermined period of time, said coil is energized and moves said switch element to its said second position.

4. A pressure sensitive control apparatus comprising a flexible diaphragm movable in response to both long-term and short-term changes in fluid pressure thereagainst, a first normally inactive switch means adjacent said diaphragm and movable repeatedly to active position by and with said diaphragm, time delay means interposed in an electrical circuit with said first switch means and activated in response to each movement of said first switch means to active position, a second switch means operatively connected to said time delay means, an electrically operable mechanism responsive to movement of said second switch means from one position to another position, and said time delay means including means to move said second switch means from said one position to said other position upon expiration only of a predetermined period of time following each activation of said first switch means whereby a delayed response of said mechanism is effected only upon said first switch means occupying said active position for said predetermined period of time.

* * * * *